United States Patent Office

3,649,653
PHOTOCHEMICAL PROCESS OF PRODUCING
3,5-DI-SUBSTITUTED FUCHSONES
Hans-Dieter Becker, Schenectady, N.Y., assignor to
General Electric Company
No Drawing. Original application Sept. 13, 1966, Ser. No.
579,008, now Patent No. 3,541,116, dated Nov. 17,
1970. Divided and this application Mar. 2, 1970, Ser.
No. 15,968
Int. Cl. C09b 11/06
U.S. Cl. 260—389                                   9 Claims

ABSTRACT OF THE DISCLOSURE

Irradiation of an acid-free acetone solution of a 2,6-di($C_{1-8}$ secondary or tertiary alkyl)phenol and a benzophenone, which can have para-substituents, using light having a wavelength in the range of 300–500 m$\mu$ produces a triphenyl carbinol intermediate. Replacing the acetone with acidified methanol converts the intermediate to a fuchsone whose 3- and 5-substituents are those of the phenol reactant and any 4'- and 4''-substituents are those of the benzophenone reactant. The fuchsones are useful as dyes and for the making of bisphenols.

---

This application is a division of my copending application, Ser. No. 579,008, filed Sept. 13, 1966, now Pat. No. 3,541,116 and assigned to the same assignee as the present invention.

This invention relates to a process of producing certain novel fuchsones claimed in my above-identified application. Within the class of quinone methides, fuchsones are of particular interest because of their early application as triphenylmethane dyes. Fuchsones are stable crystalline compounds which are different from most other quinones methides produced as non-isolable reactive intermediates in the oxidation of certain phenols. The parent compound has been known for many years, and numerous substituted fuchsones have been described in the literature. They are generally prepared by elimination of water from 4-hydroxytriphenylcarbinols, by a Grignard reaction, or by oxidation of substituted 4-hydroxytriphenylmethanes, which are in turn prepared by the acid-catalyzed condensation of phenols with aldehydes. These prior methods have been dependent on having the proper starting materials available and are only capable of producing fuchsones in which at least two of the three rings have identical substituents since the rings are those of the phenol reactant. Furthermore, these prior art methods were limited to those starting materials which did not have other substituents which were reactive under the reaction conditions.

In my copending application, Ser. No. 578,993, now U.S. Pat. 3,522,280, filed Sept. 13, 1966, and assigned to the same assignee as the present invention, I have disclosed and claimed a photochemical reaction whereby fuchsones are reacted with phenols to produce 4,4'-dihydroxytetraphenylmethanes (bisphenols) having various substituents other than the hydroxyl groups on the aryl nuclei. This method allows bisphenols to be prepared in which all four phenyl groups have different substituents so that the bisphenols produced are racemic mixtures of optically active phenols. In order to produce these racemic mixtures, it is necessary to use fuchsones in which the substituents on any one of the three rings are different from, or in different ring positions than the substituents on any one of the other two rings. My reaction is also applicable to the use of fuchsones in which the substituents on at least two of the rings are the same to produce other new and useful bisphenols. This invention relates to the photochemical process of producing fuchsones which are useful for making bisphenols by the method of my above-identified copending application. Some of these new fuchsones would be difficult if not impossible to make by the prior art processes.

The fuchsones I can make by my process have the general formula

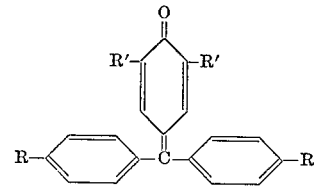

where each R is independently selected from the group consisting of hydrogen, hydroxyl, halogen, alkyl, aryl, alkoxycarbonyl, acyloxy and hydrocarbonoxy and each R' is independently selected from the group consisting of secondary and tertiary alkyl.

These products are sometimes named as substituted $\alpha,\alpha$-diphenyl-1,4-benzoquinone methides or as substituted 2,5-cyclohexadiene-1-ones. However, in this application, because it simplifies the naming of the various compounds of this invention, they will be named as substituted fuchsones using the numbering system shown below to designate the positions of the substituents.

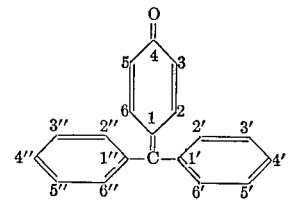

In addition to hydrogen, hydroxyl and halogen, i.e., fluorine, chlorine, bromine, iodine specifically named above, R may be alkyl, aryl, alkoxycarbonyl, i.e.,

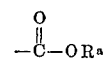

where $R^a$ is alkyl, including cycloalkyl and aralkyl; acyloxy, i.e.,

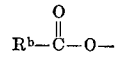

where $R^b$ is alkyl, including cycloalkyl and aralkyl, or aryl, including alkaryl; and hydrocarbonoxy, i.e., $R^c$—O— where $R^c$ is an aliphatic hydrocarbon (i.e., alkyl, akenyl and alkynyl) including cycloaliphatic and aryl substituted aliphatic hydrocarbon or aromatic hydrocarbon including aliphatic substituted aromatic hydrocarbon. Preferably R', $R^a$, $R^b$, and $R^c$ have from 1 to 8 carbon atoms but may have as many as 30 or more carbon atoms.

Typical examples of alkoxycarbonyl which R may be are: methoxycarbonyl, ethoxycarbonyl, propoxycarbonyl, butoxycarbonyl, hexoxycarbonyl, cyclohexoxycarbonyl, octoxycarbonyl, triacontoxycarbonyl, etc. Typical examples of acyloxy which R may be are: acetoxy, phenylacetoxy, propionoyloxy, butanoyloxy, octanoyloxy, triacontonyloxy, benzoyloxy, methylbenzoyloxy, toluoyloxy, naphthoyloxy, ethylbenzoyloxy, etc. Typical examples of hydrocarbonoxy which R may be are: alkoxy, e.g., methoxy, ethoxy, propoxy, butoxy, hexoxy, cyclohexoxy, phenoxy, toloxy, xyloxy, phenylethoxy, benzoxy, methylbenzoxy, etc., and, in addition, alkenoxy and alkynoxy, for example, vinoxy, alloxy, crotoxy, propargyloxy (2-propynoxy), etc. Typical examples of aryl which R may be, are phenyl, tolyl, xylyl, naphthyl, methylnapthyl, ethylphenyl, propylphenyl, diethylphenyl, etc. Examples of primary alkyl groups which R may be and the secondary and tertiary alkyl groups which both R and R' may be are, e.g., methyl, ethyl, propyl, isopropyl, butyl, sec-butyl, t-butyl, the various amyl isomers, the various hexyl isomers, up to those alkyl groups having as many as 30 or more carbon atoms, e.g., triacontyl, and including the cycloaliphatic and aryl substituted aliphatic, e.g., cyclohexyl, methylcyclohexyl, ethylcyclohexyl, benzyl, naphthylmethyl, phenylethyl, methylbenzyl, ethylbenzyl, phenylpropyl, etc.

The fuchsones in the above formula are conveniently made by my novel photochemical reaction in which a 2,6-disubstituted phenol, wherein the substituents are secondary or tertiary alkyl groups as disclosed above for R', is reacted with a benzophenone having the formula

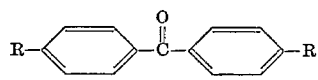

where R is as defined above in the formula for the fuchsones. The reaction between the phenol and the benzophenone is a photochemical reaction which is carried out in the substantial absence of oxygen and without the application of heat using light having a wavelength in the range of 300 to 500 mμ, but not substantially below 300 mμ. The phenol and the benzophenone are dissolved in an acid free acetone solution. The primary product formed by the reaction of the phenol with the benzophenone is a triphenyl carbinol having the formula

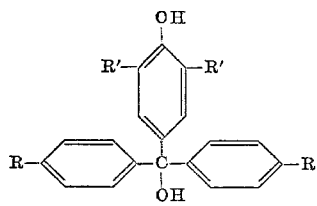

where R' and R are those substituents defined above for the fuchsones. At this point, the acetone is evaporated and the carbinol dissolved in methanol. Upon acidification of the solution with a mineral acid, e.g., hydrochloric acid, sulfuric acid, nitric acid, the carbinol is converted to the fuchsone which precipitates from the methanol solution. The fact that the acid converts the carbinol to the fuchsone is the reason the acetone must be acid-free, since if acid were present the carbinol product would be converted to the fuchsone at this point, which then can be involved in photosensitized side reactions. However, after the irradiation is stopped, it of course would be possible to acidify the acetone solution, evaporate off the acetone and then dissolve the unreacted phenol and the benzophenone with methanol, leaving behind the fuchsone product, which is then easily removed by filtration, but the acidification of the methanol solution is preferable. If the substituents on the phenol or the benzophenone would produce acidic material during irradiation, a base, e.g., ammonium hydroxide, should be present to neutralize the acidic material. Bromo and iodo, but not chloro substituents require the use of base.

In order to suppress side reactions, the wavelengths of the radiation should be such that light is absorbed by the benzophenone but not by either the product, the initial phenol or the solvent. To meet these criteria, the wavelengths of the light should include the range of 300–500 mμ, but not substantially below 300 mμ. The triphenylcarbinol intermediate, phenol, and the acetone used as a solvent all absorb in the region of 280 mμ and below. The wavelengths of the light may include those greater than 500 mμ, but preferably the greatest proportion of the wavelengths are in the cited range.

The solvent must be a liquid capable of dissolving the starting phenol and the benzophenone. Furthermore, it likewise must not absorb in the region of the wavelengths of light used. The solvent used must likewise be inert to both of the reactants, and the final product. Methanol is acidic enough that it converts some of the triphenylcarbinol to the fuchsone which then reacts with some of the phenol as disclosed in my above-identified copending application. However, this is not the only reaction, except when the phenol is 2,6-di-t-butylphenol, since the methanol is also reactive with the benzophenone. The only solvent which I have found satisfactory is acetone. However, any other solvent, which meets the above requirements, could be used in place of acetone.

A convenient source of light to be used for irradiating the solution is obtained by using an ultraviolet light and passing it through a filter, for example, Pyrex glass, which will filter out all light of wavelengths below 300 mμ. Alternatively, irradiation from any appropriate source may be used keeping in mind that the actual range of wavelengths used should include the wavelengths which are absorbed by the particular benzophenone. The radiation source is preferably chosen to contain the greatest amount possible of the wavelengths which are absorbed by the benzophenone, but not by the other components of the reaction mixture. This is because only the light absorbed by the benzophenone is utilized in promoting the reaction. When using any of above benzophenones, ultraviolet light from a mercury vapor quartz lamp filtered through Pyrex glass is very satisfactory for process.

The progress of the benzophenone reaction is easily monitored by withdrawing a small sample and determining when the concentration of phenol becomes constant. This is conveniently done by gas chromatography. The irradiation may be continued for 24 hours with no adverse effect, although in general the reaction is completed in about 4 hours in the equipment used in the examples, as shown by the amount of phenol in the reaction mixture becoming essentially constant at that time. The total time is dependent on the actual quantity of light absorbed since one quantum of light must be absorbed for each molecule of the benzophenone reacted. For highest utilization of the radiation, it should be completely absorbed by the benzophenone. For highest overall conversion of the phenol and the benzophenone to the triphenyl carbinol it is preferably to stop the irradiation at about 40–50% conversion, isolate the triphenyl carbinol and recycle the recovered phenol and benzophenone.

For as yet some unknown reason, the photochemical process is not suitable for making fuchsones in good yields from phenols in which the substituents in the 2- and 6-position are primary alkyl or aryl as disclosed above for R'. It is believed that these phenols do react to form the triphenyl carbinol, but, on acidification, the carbinol only forms the triphenylmethyl cation but does not go readily to the fuchsone.

In order that those skilled in the art may better understand my invention, the following examples are given by way of illustration and not by way of limitation. In all of the examples, all parts and percentages are by weight unless stated otherwise. In the elemental analysis of the products, the values given are in percent. The theoretical values for the analyses and molecular weights are given in parentheses following the determined values.

GENERAL PROCEDURE

The general procedure utilized in the following examples was to prepare a solution of the particular phenol and benzophenone in acetone, purge the solution with argon then irradiate the solution cooled to 18° C. At the end of the irradiation period, the acetone was evaporated under reduced pressure and the residue dissolved in methanol which was then acidified with hydrochloric acid to precipitate the fuchsone product which was then removed by filtration and recrystallized.

The light source used was a 100 watt mercury vapor lamp, General Electric type H–100 A4/T, from which the glass jacket had been removed, leaving only the quartz envelope. This was surrounded by a Pyrex glass tube assembled to allow water cooling. The lamp and Pyrex glass jacket were surrounded by a vessel to contain the reaction mixture.

EXAMPLE 1

Using the general procedure, a solution of 2.06 g. of 2,6-di-t-butylphenol and 0.98 g. of 4-methylbenzophenone in 100 ml. of acetone was irradiated for 5 hours. The light yellow solution was evaporated under reduced pressure leaving the 3,5-di-t-butyl-4-hydroxy - 4' - methyltriphenyl-carbinol and unreacted starting materials as a yellow oily residue which was dissolved in 20 ml. of methanol and acidified with one drop of concentrated hydrochloric acid dissolved in 1 ml. of methanol. The yellow crystals of the fuchsone thus formed were removed by filtration and recrystallized by dissolving in chloroform and adding methanol. A yield of 1.1 g. of 2,5-di-t-butyl-4'-methylfuchsone was obtained having a melting point of 203–204° C.

In the same manner as described in Example 1, the following fuchsones were prepared.

EXAMPLE 2

A solution of 1.05 g. of 4,4'-dimethylbenzophenone and 2.06 g. of 2,6-di-t-butylphenol in 100 ml. of acetone was irradiated 10 hours to give 0.82 g. of 3,5-di-t-butyl-4',4''-dimethylfuchsone, melting first at 190° C., but resolidifying and then melting at 195–196° C.

EXAMPLE 3

A solution of 1.08 g. of 4-chlorobenzophenone and 1.53 g. of 2,6-di-t-butylphenol in 55 ml. of acetone was irradiated for 4 hours to give 1.01 g. of 3,5-di-t-butyl-4'-chlorofuchsone having a melting point of 201–202° C.

EXAMPLE 4

A solution of 1.255 g. of 4,4'-dichlorobenzophenone and 2.06 g. of 2,6-di-t-butylphenol in 100 ml. of acetone was irradiated for 16 hours to give 1.1 g. of 3,5-di-t-butyl-4',4''-dichlorofuchsone having a melting point of 223–224° C.

EXAMPLE 5

A solution of 1.305 g. of 4-bromobenzophenone and 2.06 g. of 2,6-di-t-butylphenol in 75 ml. of acetone containing 0.2 ml. of concentrated aqueous ammonium hydroxide was irradiated 3 hours to produce 1.46 g. of 3,5-di-t-butyl-4'-bromofuchsone having a melting point of 209–210° C. In this example, the ammonium hydroxide was necessary because of the bromine substituent on the benzophenone which upon irridation produces a slight amount of HBr.

EXAMPLE 6

A solution of 1.98 g. of 4-hydroxybenzophenone and 4.12 g. of 2,6-di-t-butylphenol in 150 ml. of acetone was irradiated for 27 hours to produce 2.0 g. of 3,5-di-t-butyl-4'-hydroxyfuchsone which first melts at 248–250° C. then resolidifies and melts at 258–260° C.

EXAMPLE 7

A solution of 1.21 g. of 4,4'-dimethoxybenzophenone and 2.06 g. of 2,6-di-t-butylphenol in 60 ml. of acetone was irradiated for 4 hours to produce 0.8 g. of 3,5-di-t-butyl-4',4''-dimethoxyfuchsone having a melting point of 180° C.

EXAMPLE 8

A solution of 1.45 g. of 4,4'-dipropargyloxybenzophenone and 2.06 g. of 2,6-di-t-butylphenol in 60 ml. of acetone was irradiated for 14 hours to produce 1.05 g. of 3,5-di-t-butyl - 4,4' - di-propargyloxyfuchsone having a melting point of 141–142° C. In this reaction, 1 ml. of ammonium hydroxide was present as a precautionary measure, since there was a possibility that some acid might be present in the 4,4'-dipropargyloxybenzophenone because of the method of its preparation.

EXAMPLE 9

A solution of 1.49 g. of 4,4'-diacetoxybenzophenone and 2.06 g. of 2,6-di-t-butylphenol in 75 ml. of acetone was irradiated for 11 hours to produce 1.53 g. of 3,5-di-t-butyl-4',4''-diacetoxyfuchsone having a melting point of 262–263° C.

It will be recognized that in this example the 4,4'-diacetoxybenzophenone is the diacetate derivitive of 4,4'-dihydroxybenzophenone which itself has been used in place of the diacetate derivitive, but the yields were lower. Since the above diacetate derivative of the fuchsone can be hydrolyzed after the formation of the fuchsone to produce the corresponding dihydroxyfuchsone and because the yields are higher in the irradiation step, it is preferable to use the diacetate derivative of the 4,4'-dihydroxybenzophenone. The following example illustrates the hydrolysis step.

EXAMPLE 10

A suspension of 2.43 g. of 3,5-di - t - butyl - 4',4'' - diacetoxybutylfuchsone, prepared as above, in 75 ml. of methanol containing 3 ml. of concentrated aqueous hydrochloric acid was refluxed with stirring for 4 hours. Concentration of this solution produced a precipitate which after recrystallization from methanol gave 2.0 g. of 3,5-di-t-butyl-4',4''-dihydroxyfuchsone having a melting point of 324–325° C.

EXAMPLE 11

A solution of 2.11 g. of 4,4'-dibenzoyloxybenzophenone and 2.06 g. of 2,6-di-t-butylphenol in 100 ml. of acetone was irradiated for 28 hours to give 1.2 g. of 3,5-di-t-butyl-4',4''-benzoyloxyfuchsone having a melting point of 284–285° C.

EXAMPLE 12

A solution of 1.2 g. of 4-methoxycarbonylbenzophenone and 2.06 g. of 2,6-di-t-butylphenol in 60 ml. of acetone was irradiated for 5 hours to yield 1.16 g. of 3,5-di-t-butyl-4'-methoxycarbonylfuchsone having a melting point of 187–188° C.

EXAMPLE 13

A solution of 1.82 g. of benzophenone and 3.05 g. of 2,6-diisopropylphenol in 150 ml. of acetone was irradiated for 16 hours yielding 1.3 g. of 3,5-diisopropylfuchsone having a melting point of 171–172° C.

EXAMPLE 14

A solution of 0.98 g. of 4-methylbenzophenone and 1.78 g. of 2,6-diisopropylphenol in 60 ml. of acetone was irradiated for 8 hours to yield 0.75 g. of 3,5-diisopropyl-4'-methylfuchsone which first melted at 159–160° C., but then resolidified and melted at 164–165° C.

EXAMPLE 15

A solution of 1.82 g. of benzophenone and 2.58 g. of 2,6-dicyclohexylphenol in 60 ml. of acetone was irradiated for 11 hours to yield 1.45 g. of 3,5-dicyclohexylfuchsone having a melting point of 238–240° C.

EXAMPLE 16

A solution of 0.98 g. of 4-methylbenzophenone and 2.58 g. of 2,6-dicyclohexylphenol in 60 ml. of acetone was irradiated for 4½ hours to yield 1.1 g. of 3,5-dicyclohexyl-4'-methylfuchsone having a melting point of 209–210° C.

EXAMPLE 17

A solution of 1.05 g. of 4,4'-dimethylbenzophenone and 1.54 g. of 2,6-dimethoxyphenol in 100 ml. of acetone was irradiated for 16 hours to yield 0.25 g. of 3,5-dimethoxy-4',4''-dimethylfuchsone having a melting point of 230° C.

The following Table I gives the analytical data and molecular weights determined for the above fuchsones.

TABLE I

| Example | C | H | M.W. |
|---|---|---|---|
| 1 | 87.25 (87.45) | 8.49 (8.39) | 379 (384.60) |
| 2 | 87.53 (87.39) | 8.48 (8.60) | 388 (398.60) |
| 3 | 80.30 (80.08) | 7.17 (7.22) | 413 (404.99) |
| 4 | 73.84 (73.08) | 6.47 (6.42) | 429 (439.43) |
| 5 | 72.20 (72.16) | 6.67 (6.50) | 435 (449.44) |
| 6 | 84.04 (83.90) | 7.78 (7.82) | 383 (386.54) |
| 7 | 80.66 (80.90) | 7.91 (7.96) | 424 (430.60) |
| 8 | 82.89 (82.81) | 7.31 (7.16) | 458 (478.64) |
| 9 | 76.59 (76.52) | 7.21 (7.04) | 465 (486.62) |
| 10 | 80.59 (80.56) | 7.68 (7.51) | 422 (402.54) |
| 11 | 80.87 (80.63) | 6.38 (6.27) | 582 (610.76) |
| 12 | 81.46 (81.27) | 7.52 (7.53) | 416 (428.55) |
| 13 | 87.52 (87.68) | 7.65 (7.65) | 350 (342.49) |
| 14 | 87.33 (87.60) | 7.99 (7.92) | 358 (356.52) |
| 15 | 88.29 (88.10) | 8.11 (8.11) | 422 (422.62) |
| 16 | 88.10 (88.03) | 8.31 (8.31) | 431 (436.65) |
| 17 | 79.48 (79.74) | 6.45 (6.40) | 345 (346.43) |

The fuchsones prepared by the method of this invention have a wide variety of uses, for example, they are highly colored and may be used as dyes. As disclosed above, they also may be used as intermediates in the process of making bisphenols or hindered phenols as disclosed and claimed in my copending application, Ser. No. 578,993, now U.S. Pat. 3,522,280, filed Sept. 13, 1966 and assigned to the same assignee as the present invention. Other uses for the fuchsones will be readily recognized by those who are skilled in the art.

Obviously other modifications and variations of the present invention are possible in the light of the above teachings. Therefore, it is to be understood that changes may be made in the particular embodiments of the invention described which are within the full intended scope of the invention and defined by the appended claims.

What I claim as new and desire to secure by Letters Patent of the United States is:

1. The process of producing fuchsones which comprises irradiating, in the substantial absence of oxygen and applied heat, with light having a wavelength in the range of 300–500 mμ, but not substantially below 300 mμ, an acid-free acetone solution of (a) a 2,6-disubstituted phenol wherein the substituents have from 1 to 8 carbon atoms and are selected from the group consisting of secondary and tertiary alkyl groups and (b) a benzophenone having the formula

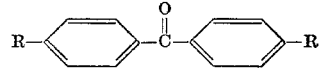

where R has no more than 8 carbon atoms and is selected from the group consisting of hydrogen, halogen, hydroxyl, alkyl, aryl, alkoxycarbonyl, alkylcarbonyloxy, arylcarbonyloxy and hydrocarbonoxy, thereafter replacing the acetone solvent with methanol and acidifying the solution to precipitate the fuchsone product.

2. The process of claim 1 wherein the phenol is 2,6-di-t-butylphenol.

3. The process of claim 1 wherein the phenol is 2,6-di-t-butylphenol and the benzophenone is 4,4'-diacetoxybenzophenone.

4. The process of claim 1 wherein the phenol is 2,6-di-t-butylphenol and the benzophenone is 4,4'-dipropargyloxybenzophenone.

5. The process of claim 1 wherein the phenol is 2,6-diisopropylphenol.

6. The process of claim 1 wherein the phenol is 2,6-diisopropylphenol and the benzophenone is 4-methylbenzophenone.

7. The process of claim 1 wherein the phenol is 2,6-dicyclohexylphenol.

8. The process of claim 1 wherein the phenol is 2,6-dicyclohexylphenol and the benzophenone is unsubstituted.

9. The process of claim 1 wherein the phenol is 2,6-dicyclohexylphenol and the benzophenone is 4 - methylbenzophenone.

References Cited

UNITED STATES PATENTS 3,083,214    3/1963    Serres et al. _____ 260—389

LORRAINE A. WEINBERGER, Primary Examiner

L. A. THAXTON, Assistant Examiner

U.S. Cl. X.R.

204—158 R; 260—395